United States Patent
Eldridge

(10) Patent No.: US 6,345,744 B1
(45) Date of Patent: Feb. 12, 2002

(54) DUCK HUNTER'S CADDY

(76) Inventor: Ezekiel Clay Eldridge, 100 N. Governor Miro, Lafayette, LA (US) 70506

( * ) Notice: Subject to any disclaimer, the term of this patent is extended or adjusted under 35 U.S.C. 154(b) by 0 days.

(21) Appl. No.: 09/642,864

(22) Filed: Aug. 21, 2000

(51) Int. Cl.⁷ .............................. A45F 4/02; A45F 3/04
(52) U.S. Cl. ...................... 224/153; 224/576; 224/645; 224/223; 220/560; 441/129; 441/131; 383/3
(58) Field of Search .................. 224/153, 575, 224/576, 577, 627, 645, 651, 654, 657, 233; 441/42, 66, 67, 80, 88, 111, 114, 125, 129, 131; 220/560; 383/3

(56) References Cited

U.S. PATENT DOCUMENTS

| | | | |
|---|---|---|---|
| 125,069 A | * 3/1872 | Miller | .................. 224/223 X |
| 3,678,611 A | * 7/1972 | Files | |
| 4,099,656 A | * 7/1978 | Neumann et al. | |
| 4,157,134 A | * 6/1979 | Stoll | |
| 4,160,299 A | 7/1979 | Hilbern | |
| 4,384,602 A | * 5/1983 | Ores | .................. 383/3 X |
| 4,638,593 A | 1/1987 | Garcia | |
| 4,790,463 A | * 12/1988 | Hansen | |
| 4,809,352 A | * 2/1989 | Walker | .................. 383/3 |
| D309,937 S | 8/1990 | Baxter | |
| 5,217,131 A | * 6/1993 | Andrews | .................. 383/3 X |
| 5,234,144 A | * 8/1993 | Iler | |
| 5,297,978 A | * 3/1994 | Ramsey | .................. 441/131 |
| 5,402,596 A | 4/1995 | Gillming, Jr. | |
| 5,619,819 A | 4/1997 | Hauschild | |
| 5,653,337 A | * 8/1997 | Cirgliano | .................. 224/223 X |
| 5,967,390 A | * 10/1999 | Goryl | .................. 224/153 |

FOREIGN PATENT DOCUMENTS

| | | | | |
|---|---|---|---|---|
| SE | 239863 | * 11/1945 | ................. | 224/209 |
| SE | 339335 | * 8/1959 | ................. | 224/209 |

* cited by examiner

*Primary Examiner*—Gregory M. Vidovich
(74) *Attorney, Agent, or Firm*—William W. Stagg

(57) ABSTRACT

A floating caddy for holding and storing the gear of wading hunters comprising an inflatable tube formed from an impermeable fabric for providing flotation for the caddy. The tube is configured to create a water resistant storage compartment within its periphery. The top of the storage compartment has weather resistant zipper for access into the storage compartment. The caddy is fitted with straps for attaching a shotgun and shoulder straps mounted to the tube to allow the caddy to be carried on the back of the hunter in knapsack fashion. The caddy may be floated in and out of a flooded area by a wading hunter by means of a tether attached to the tube. The fabric forming the caddy maybe printed in a desired camouflage pattern.

19 Claims, 3 Drawing Sheets

DUCK HUNTER'S CADDY

FIELD OF INVENTION:

The present invention generally relates to the field of hunting and, more particularly, relates to a floating caddy for holding a duck hunter's equipment and other hunting accouterments when the hunter is wading in flooded fields and timber.

BACKGROUND OF THE INVENTION

Duck and water fowl hunters often find themselves wading in flooded fields and timber to position themselves in the proper location to meet incoming water fowl. A wading duck hunter typically must carry all of the necessary hunting equipment while wading. This equipment would include shotgun, shotgun shells, decoys, and extra clothing. Because of the weight of this equipment the wading hunter must usually limit the amount of equipment he carries. What the hunter cannot carry must be left ashore. Thus the wading hunter may be required to return frequently to the shore or bank to obtain additional supplies. In many circumstances the wading is difficult due to the depth of the water, the type of water bottom, the weight of the equipment being carried, the weather conditions, and the age and physical condition of the hunter.

Pocketed waist belts and wading vests have been suggested in an effort to solve the problems of equipment handling presented to wading water fowl hunters. Others have suggested waterproof storage bags and knapsacks to be carried out and then hung on a convenient tree branch or tree stump. Typically the wading vest or waist belt is not spacious enough to carry all of the necessary gear. Because of the way the vests and belts must be worn by the hunter, they limit the depth of water in which a hunter may wade. Often there is no convenient branch or tree stump to support the knapsack or bag. In each case, the loaded belt, vest, bag or knapsack must be carried in and out of the flooded area by the wading hunter, increasing the difficulty and physical demands on the hunter.

For hunting and fishing use, some have proposed personnel floatation devices such as that described in U.S. Pat. No. 4,160,299 to Hilbern. The Hilbern patent proposed a floating inner tube having a seat to support the hunter out of the water. This would allow the hunter to sit and rest in the open water. The problem associated with the Hilbern patent is that the hunter must position himself on the seat with his legs dangling below the tube. Such positioning would limit the depth of water in which the hunter may wade. In addition, Hilbern makes no provision for storage of the hunter's equipment.

Others have suggested that hunters and fishermen pull boat-like carries such as that proposed by Gillming, Jr. in U.S. Pat. No. 5,402,596 for a floating fishing rod holder. The holder of Gillming, Jr. is comprised of a hard boat-like hull that has racks for fishing rods and open deck for equipment storage. However, it should be noted that the Gillming, Jr. does not disclose or suggests a device that is suitable for use by a wading hunter. The device as disclosed by Gillming, Jr. is heavy, bulky, and rigid. When seeking areas suitable for game, hunters must often hike to and from flooded areas over areas that are not flooded. The device of Gillming, Jr. is not readily adaptable to be carried and moved by a hunter when the hunter is not traveling over water.

Consequently, a need exists for an improved hunting equipment carrier for use by wading water fowl hunters that will allow the hunter to readily transport equipment while wading and that will be readily adapted for use when the hunter is not wading.

SUMMARY OF INVENTION

The present invention provides a method and apparatus designed to satisfy the aforementioned needs. The proposed apparatus provides a floating water resistant caddy or carrier that allows the wading hunter to transport equipment and supplies in and out of the flooded areas. In its preferred embodiment, the device is comprised of an inflatable and deflatable ring or tube made from impermeable material such as rubber lined canvas or CORDURA®. A large central storage pocket is formed from the ring in combination with a bottom cover and a top cover having a zipper device for providing access to the storage pocket. The central storage pocket may be used for storing and holding hunting equipment such as duck calls, shotgun shells, gloves, thermos bottles, food items as well as larger items such as a coat or rain gear. The central storage pocket, when closed, provides for water resistant storage for the hunting equipment.

The floating caddy is provided with straps for securing and supporting a hunter's shotgun. The caddy also has a plurality of attachment rings for attaching the game bagged during the hunt. A tether is provided for attachment to the rings to allow the hunter to pull the tube along during wading. The tether can also be used to secure the caddy to the hunter's waist or to a tree or tree branch. Ideally the caddy is colored olive drab or brown color or printed with a desired camouflage pattern.

A significant feature of applicant's device is that the caddy is provided with shoulder straps that allow the caddy to be carried on the hunter's back. In this position, the caddy may be used by the hunter much like a conventional knapsack when the hunter is hiking to and from the flooded hunting locations. Another important feature of applicant's invention is that floating caddy allows the hunter to use the caddy as a personal flotation device in the event the hunter steps in holes or deep spots while wading and need additional flotation.

Another advantage of the inflatable tube construction of applicant's device is that the caddy described herein is light, not bulky, and easy to carry. The weight of the caddy being insubstantial compared to its holding capabilities.

Therefore, it is an object of applicant's invention to provide a floating equipment caddy for use by a wading hunter. It is another object of applicant's invention to provide a floating holder for supporting a hunter's gun. It is a further object of the invention to provide a floating storage area for a hunter's supplies and necessities that will be easily pulled in and out of hunting areas by a wading hunter. It is still another object of applicant's invention to provide a floating equipment carrier that also serves as a knapsack device when the hunter is traversing over normal ground areas. Other objects of the invention will be apparent from the description contained herein.

DESCRIPTION OF PREFERRED EMBODIMENT

Figure 1:
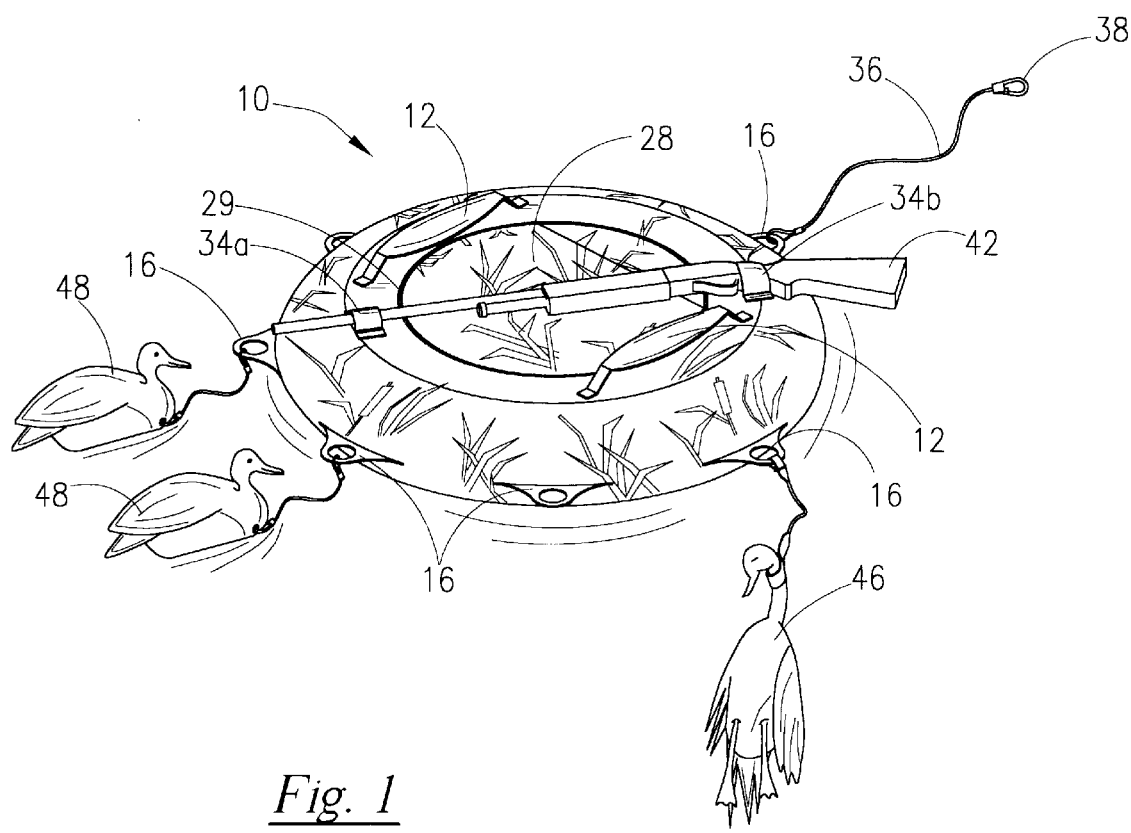
FIG. 1 is a perspective view of the floating equipment caddy of applicant's invention.

Referring now to the drawings there is shown the floating equipment caddy 10 of applicant's invention. As noted in FIG. 1, the caddy 10 has cover 28 that covers an interior storage area 22. The cover 28 is opened and closed by means of a zipper 29 to provide water resistant access to the storage area 22. The caddy 10 has tabs 34a and 34b, each with hook and loop fasteners, to allow a hunter's shotgun 42 to be attached and secured to the caddy 10.

A plurality of rings 16 are mounted on the caddy 10 for attaching decoys 48, game 46 and other items. A tether 36 is secured to one of the rings 16. This allows a wading hunter to pull the floating caddy 10. The tether 36 has a snap hook 38 for attachment to a hunter's belt loops or a D-ring on a hunter's garments if the hunter so desires. Shoulder straps 12 for carrying the caddy 10 are shown mounted on the caddy 10 on either side of the cover 28.

Figure 2:
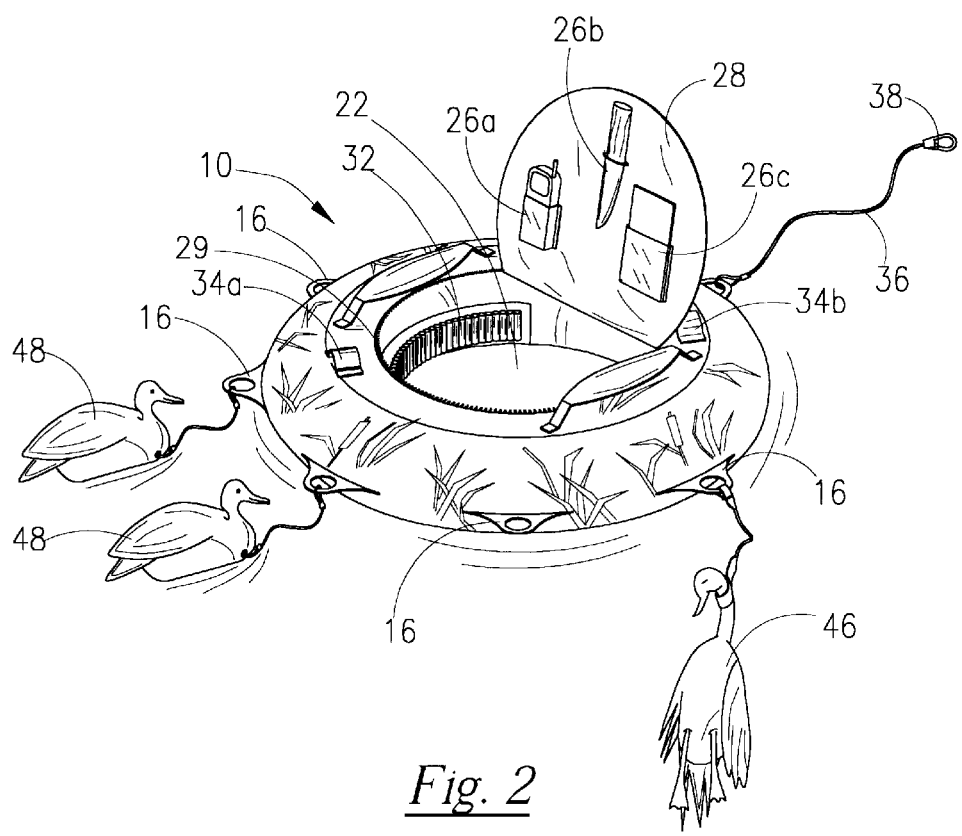
FIG. 2 is an additional perspective view of the equipment caddy shown in FIG. 1 illustrating the central pocket of the caddy.

FIG. 2 shows the caddy 10 with the cover 28 in the open position. The internal storage area 22 has a plurality of loops 32 for holding shot shells 44. Pockets 26a, 26b and 26c are fitted on the inside of the cover 28 for storage of small items such as a knife, radio, compass and the like. The interior 22 of the caddy 10 may be used to store larger or bulky items like waders, rain gear, thermos bottles and food items.

Figure 3:
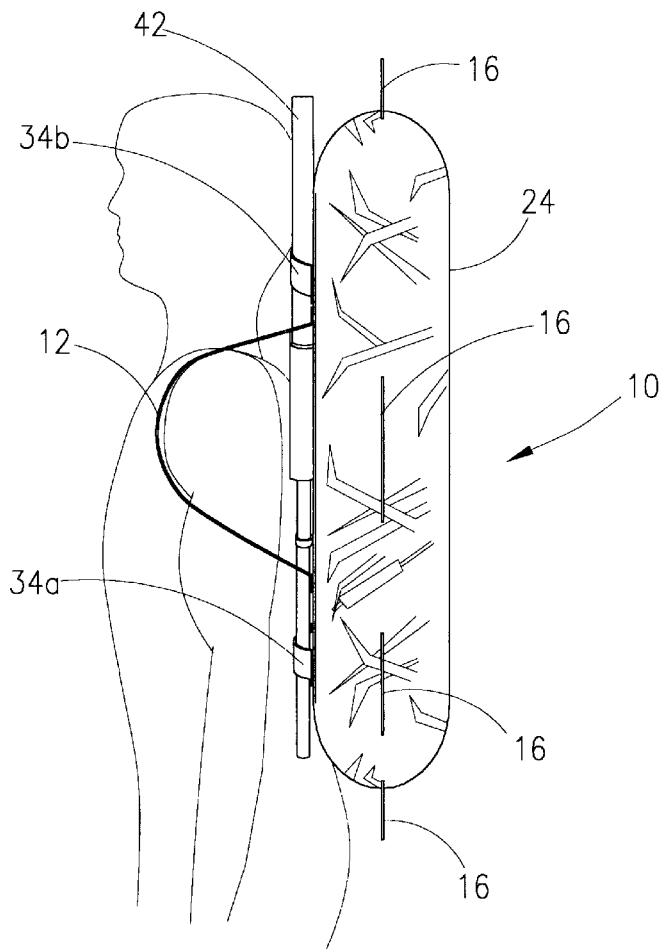
FIG. 3 is a side view of the caddy illustrating use of the caddy shoulder straps.

Use of the caddy 10 in the knapsack position is shown in FIG. 3. The caddy 10, when loaded with accompanying gear and gun 42, may be carried on the shoulders of a hunter by means of the shoulder straps 12. The shoulder straps 12 allow the hunter to carry the caddy and gear to and from a flooded hunting area. When the flooded hunter area is reached, the hunter can remove the caddy and use it to float his gear while wading in the flood areas.

Figure 4:
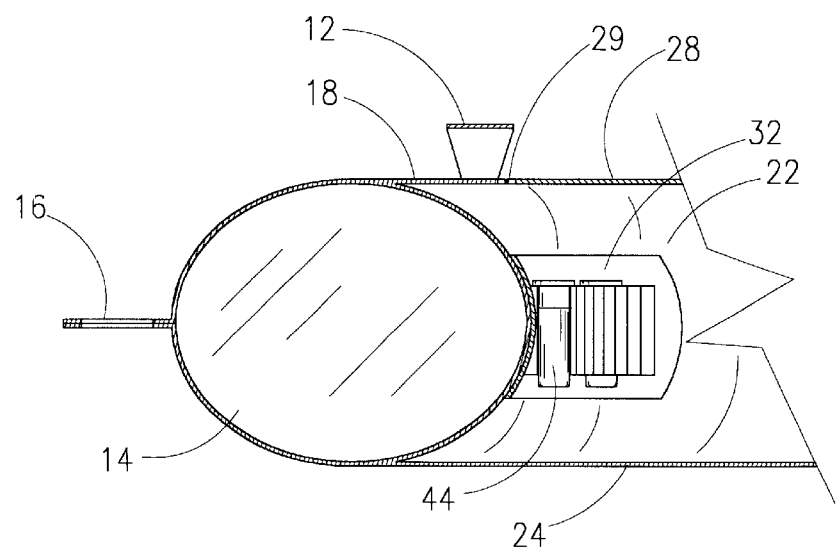
FIG. 4 is a partial cross-sectional view of the caddy of FIG. 1.

FIG. 4 is a partial cross-section view of the caddy 10. As can be seen the interior storage area 22 is formed from a bottom wall 24, an inflatable bladder or tube 14, and the cover 28. While not shown, it is understood that valve means for inflation and deflation of the tube 14 will be provided. In the preferred embodiment, the tube 14, wall 24 and cover 28 of the caddy 10 is formed from rubber or neoprene coated CORDURA® fabric. However, it is thought that other impermeable fabric such as rubber or vinyl coated canvas or nylon may also be utilized for the caddy. As can be seen the interior area 22 has a plurality of shell loops 32 for holding shot shells 44. Ideally, the fabric forming the caddy 10 may be printed in a desired camouflage pattern or the fabric may be dyed a flat color in brown, tan or olive.

Figure 5:
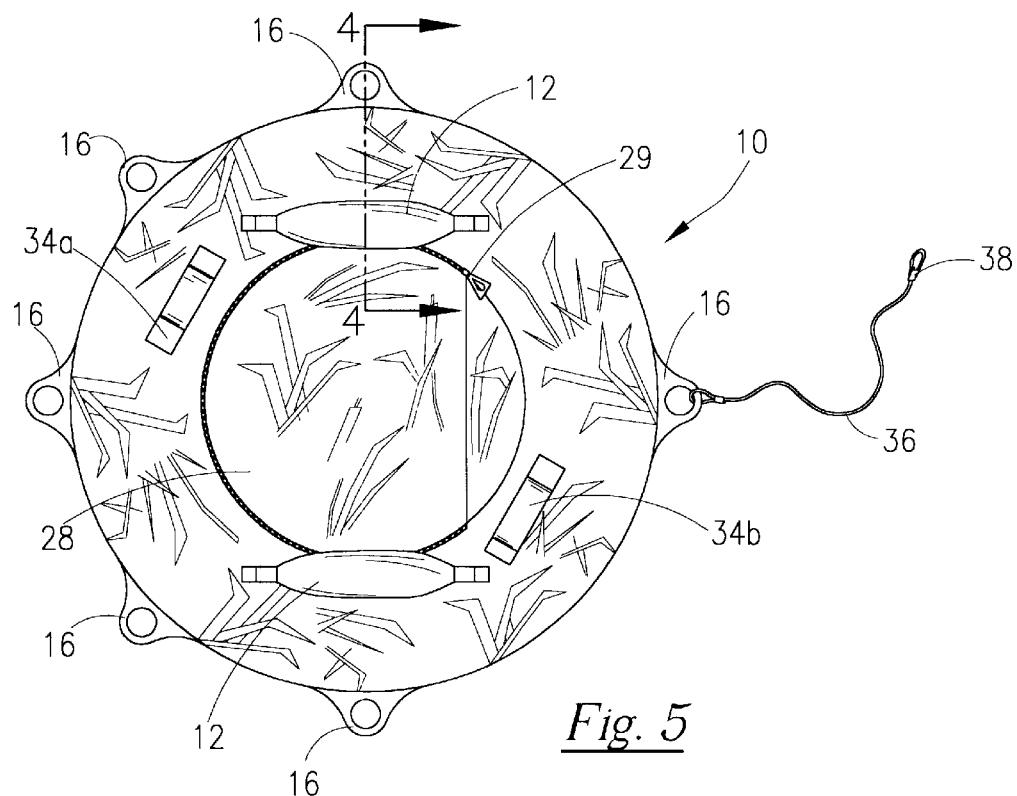
FIG. 5 is a top view of the caddy of FIG. 1.

The top view of the caddy 10 with the cover 28 closed is shown in FIG. 5. It can be seen the when the cover 28 is zipped closed, the caddy 10 provides an enclosed water resistant storage area for hunting supplies. The caddy 10, when floating, is easily pulled by a hunter by means of the tether 36, which tether may attached to the hunter's clothing by means of snap hook 38.

Figure 6:
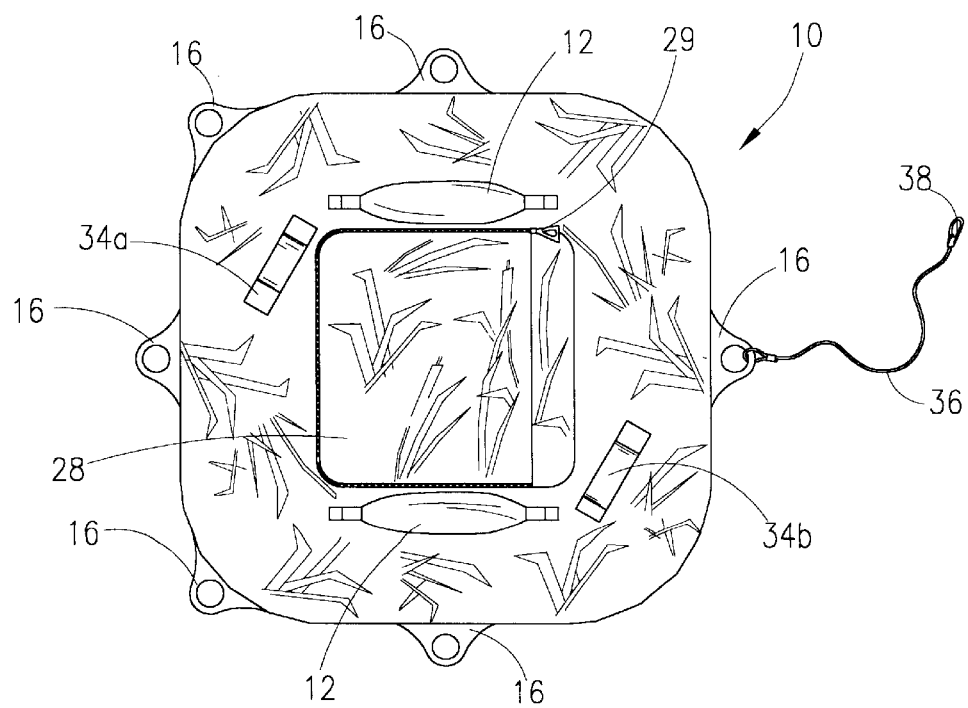
FIG. 6 is a plan view of an alternate configuration of applicant's invention.

The caddy 10 in an alternate rectangular embodiment is shown is FIG. 6. This embodiment of the floating caddy incorporates the same features as the embodiment shown in FIG. 1 such the as the gun holder loops 34a and 34b, the shoulder straps 12, zippered cover 28, and the attachment rings 16.

It is thought that the duck hunter's caddy of the present invention and its attendant advantages will be understood from the foregoing description. It is also thought that it will be apparent that various changes could be made in the form, construction and arrangement of its parts without departing from its spirit and scope or sacrificing all of its material advantages. The form described and disclosed herein is intended to merely present a preferred or exemplary embodiment of applicant's invention.

I claim:

1. A floating caddy for hunters comprising:
    a) a toroidal-shaped inflatable tube, said tube being formed to create and support a central storage area, said storage area having a bottom and a top;
    b) means for opening and closing said top of said storage area;
    c) shoulder straps mounted to said tube; and
    d) a tether attached to said tube.

2. The caddy for hunters as recited in claim 1, further comprising straps mounted to said caddy for holding and supporting a shotgun.

3. The caddy for hunters as recited in claim 2, further comprising a plurality of rings for attaching lines mounted to said caddy.

4. The caddy for hunters as recited in claim 3, wherein said storage area has a plurality of loops for holding shot shells.

5. The caddy for hunters as recited in claim 4, wherein said cover has an inside surface having a plurality of storage pockets attached thereto.

6. The caddy for hunters as recited in claim 5, wherein said tube and said top and said bottom of said storage area is made from an impermeable fabric.

7. The caddy for hunters as recited in claim 6, wherein said fabric is printed in a camouflage pattern.

8. A floating caddy for holding and storing the gear of wading hunters comprising:
    (a) a toroidal-shaped inflatable tube,
    (b) a water resistant storage compartment mounted to said tube, said storage compartment having a bottom and a top;
    (c) means for opening and closing said top of said storage compartment;
    (d) strap means for attaching a shotgun to said tube;
    (e) a pair of shoulders straps mounted to said tube for carrying said caddy on the shoulders of said hunter; and
    (f) a tether attached to said tube for pulling said tube when said hunter is wading.

9. A floating caddy as recited in claim 8, wherein said caddy is printed in a camouflage pattern.

10. A floating caddy as recited in claim 8, further comprising a plurality of attachment rings mounted to said tube.

11. A floating caddy as recited in claim 10, wherein said means for opening and closing said top of said storage compartment is a zipper.

12. A floating caddy as recited in claim 11, where said top of said storage compartment contains a plurality of pockets.

13. A floating caddy as recited in claim 12, where said storage compartment has a plurality of loops for holding shot shells.

14. A floating caddy for holding and storing the gear of a wading hunter comprising:
    (a) a toroidal-shaped inflatable tube formed from an impermeable fabric for floating said caddy, said tube being formed to create a water resistant storage compartment within its periphery, said storage compartment having a water resistant bottom and a water resistant top;

(b) means for opening and closing said top of said storage compartment;
(c) strap means for attaching a shotgun to said tube, said strap means having hook and loop fasteners for opening and closing said shotgun attaching straps;
(d) a pair of shoulder straps mounted to said tube whereby said caddy may be carried on the shoulders of said hunter; and
(e) a tether attached to said tube whereby said caddy may be pulled along when said hunter is wading.

15. A floating caddy as recited in claim 14, further comprising a plurality of attachment rings mounted to said tube.

16. A floating caddy as recited in claim 15, wherein said means for opening and closing said top of said storage compartment is a zipper.

17. A floating caddy as recited in claim 16, where said top of said storage compartment contains a plurality of pockets.

18. A floating caddy as recited in claim 17, where said storage compartment has a plurality of loops for holding shot shells.

19. A floating caddy as recited in claim 18, wherein said caddy is printed in a camouflage pattern.

\* \* \* \* \*